(12) United States Patent
Jung

(10) Patent No.: US 11,859,709 B2
(45) Date of Patent: Jan. 2, 2024

(54) MOTOR DRIVEN POWER STEERING DEVICE

(71) Applicants: Hyundai Motor Company, Seoul (KR); Kia Corporation, Seoul (KR)

(72) Inventor: Un Jae Jung, Osan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/835,199

(22) Filed: Jun. 8, 2022

(65) Prior Publication Data

US 2023/0016317 A1    Jan. 19, 2023

(30) Foreign Application Priority Data

Jul. 14, 2021   (KR) .................. 10-2021-0092096

(51) Int. Cl.
*F16H 57/04*      (2010.01)
*B62D 5/04*       (2006.01)

(52) U.S. Cl.
CPC ....... *F16H 57/0498* (2013.01); *B62D 5/0454* (2013.01); *F16H 57/0434* (2013.01)

(58) Field of Classification Search
CPC ............. F16H 57/0498; F16H 57/0434; B62D 5/0454
See application file for complete search history.

(56) References Cited

U.S. PATENT DOCUMENTS

| | | | | |
|---|---|---|---|---|
| 1,667,285 A | * | 4/1928 | Clisson | F16H 57/039 74/467 |
| 1,953,068 A | * | 4/1934 | Barker | F16H 57/0498 184/31 |
| 3,396,611 A | * | 8/1968 | Smith | F16H 57/0498 184/6 |
| 2017/0328462 A1 | * | 11/2017 | Miyake | B32B 7/027 |

* cited by examiner

*Primary Examiner* — Jake Cook
(74) *Attorney, Agent, or Firm* — Slater Matsil, LLP

(57) ABSTRACT

A motor driven power steering device including a motor and a speed reducer configured to decelerate a rotation speed of the motor, wherein the speed reducer includes a worm gear coupled to a drive shaft of the motor and rotatably installed to a speed reducer housing through a bearing, a worm wheel gear-coupled with the worm gear, and a rotation member mounted between the worm gear and the bearing and configured to circulate a lubrication agent applied between the worm gear and the worm wheel.

20 Claims, 8 Drawing Sheets

MOTOR DRIVEN POWER STEERING DEVICE

CROSS-REFERENCE TO RELATED APPLICATIONS

This application claims the benefit of Korean Patent Application No. 10-2021-0092096, filed on Jul. 14, 2021, which application is hereby incorporated herein by reference.

TECHNICAL FIELD

The present invention relates to a motor driven power steering device.

BACKGROUND

In general, a power steering device for steering a vehicle is of a hydraulic pressure type or a motor driven type, and recently a motor driven power steering (MDPS) device has replaced the hydraulic pressure type, and an application range thereof is expanding.

In the motor driven power steering device, a motor that applies an auxiliary torque to a column shaft to reduce the steering torque of the driver, and a reducer that converts a torque of high-speed and low-torque generated from the motor into a torque of low-speed and high-torque, are installed.

The reducer is provided inside the housing, and a lubrication agent such as grease is applied to the internal parts of the reducer to increase the lubrication performance.

In general, when the reducer of the motor driven power steering device is mounted on the vehicle, since the grease is not replenished until the end of its lifespan, depending on the operation of the internal parts of the reducer, cases that the grease may be aggregated or gathered around a specific part occur.

If the grease is not evenly applied to the internal parts of the reducer, the lubrication action does not work smoothly, so a noise is generated from the internal parts of the reducer or the frictional force increases.

The above information disclosed in this background section is only for enhancement of understanding of the background of the invention, and therefore it may contain information that does not form the prior art that is already known to a person of ordinary skill in the art.

SUMMARY

The present invention relates to a motor driven power steering device. Particular embodiments relate to a motor driven power steering device in which a lubrication agent inside a reducer may be smoothly recirculated.

Embodiments of the present invention provide a motor driven power steering device capable of maintaining a state in which the lubrication agent is evenly applied to the internal parts of the reducer to solve a problem in the art.

A motor driven power steering device according to an embodiment of the present invention includes a motor generating power and a reducer decelerating a rotation speed of the motor, wherein the reducer includes a worm gear coupled to the drive shaft of the motor and rotatably installed to the reducer housing through a bearing, a worm wheel gear-coupled with the worm gear, and a rotation member mounted between the worm gear and the bearing and circulating the lubrication agent applied between the worm gear and the worm wheel.

The rotation member may include a rotation body mounted on the shaft of the worm gear and at least one blade formed on the rotation body.

The blade may be formed on the opposite side of the bearing.

A plurality of the blades may be formed with an equal interval on the rotation body.

The rotation member may be press-fitted onto the shaft of the worm gear.

The motor driven power steering device according to an embodiment of the present invention may further include a lubrication agent pocket installed in the reducer housing to discharge the lubrication agent flowing along the worm gear in the direction of the worm wheel.

The lubrication agent pocket may include a pocket housing provided to surround the rotation member, an inlet formed in the pocket housing and opened in the shaft direction of the worm gear, and an outlet formed in the pocket housing and opened in the direction of the worm wheel.

The lubrication agent pocket may be fixedly installed on the reducer housing.

The worm gear may be disposed in the direction of gravity.

According to the motor driven power steering device according to an embodiment of the present invention as described above, the lubrication agent applied to the worm gear and the worm wheel constituting the reducer is recirculated through the rotation member, thereby reducing the frictional force between the worm gear and the worm wheel and reducing vibration and noise.

In addition, the lubrication agent applied to the worm gear and the worm wheel is prevented from inflowing to the bearing, and noise generated by the inflow of the lubrication agent to the bearing may be reduced.

BRIEF DESCRIPTION OF THE DRAWINGS

Since these drawings are for reference in describing embodiments of the present invention, the technical idea of the present invention should not be construed as being limited to the accompanying drawings.

Figure 1:
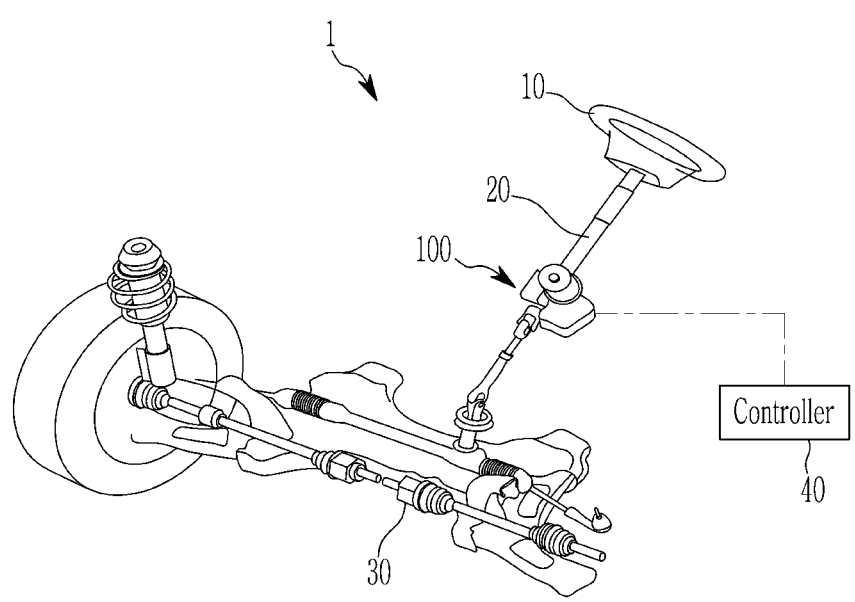
FIG. 1 is a perspective view showing a configuration of a motor driven power steering device according to an embodiment of the present invention.

The following descriptors may be used in connection with the drawings to describe various embodiments of the present invention.

1: motor driven power steering device
10: steering wheel
20: column shaft
30: rack bar
40: controller
100: motor driving unit
110: motor
120: reducer
121: worm gear
123: worm wheel
130: bearing
140: rotation member
141: rotation body
143: fixing hole
145: blade
150: lubrication agent pocket
151: pocket housing
153: center hole
155: inlet
157: outlet

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to elucidate embodiments of the present invention, parts that are not related to the description will be omitted. Like reference numerals designate like elements throughout the specification.

Further, the size and thickness of each of the elements that are displayed in the drawings are arbitrarily described for better understanding and ease of description, the present invention is not limited by the described size and thickness, and the thickness of layers, films, panels, regions, etc., are exaggerated for clarity.

Hereinafter, a motor driven power steering device according to embodiments of the present invention will be described in detail with reference to the attached drawings.

FIG. 1 is a perspective view showing a configuration of a motor driven power steering device according to an embodiment of the present invention.

As shown in FIG. 1, a motor driven power steering (MDPS) device 1 according to an embodiment of the present invention includes a steering wheel 10, a column shaft 20, a motor driving unit 100, a rack bar 30, and a controller 40.

The steering wheel 10 controls the driving direction of the vehicle by the operation of the driver.

The column shaft 20 is connected to the steering wheel 10, and when the driver rotates the steering wheel 10, a torque is transmitted to the rack bar 30 through the column shaft 20, and the steering angle of the steering wheel 10 is changed according to the left and right movement of the rack bar 30.

The motor driving unit boo is installed on the column shaft 20 and applies an auxiliary torque to the column shaft 20 to reduce the steering torque of the driver.

To this end, the motor driving unit 100 may include a motor 110 generating power and a reducer 120 for deceleration of a rotation speed of the motor 110.

The controller 40 controls the torque and the speed of the motor driving unit 100 based on the steering angle of the steering wheel 10 detected through the sensor.

Figure 2:
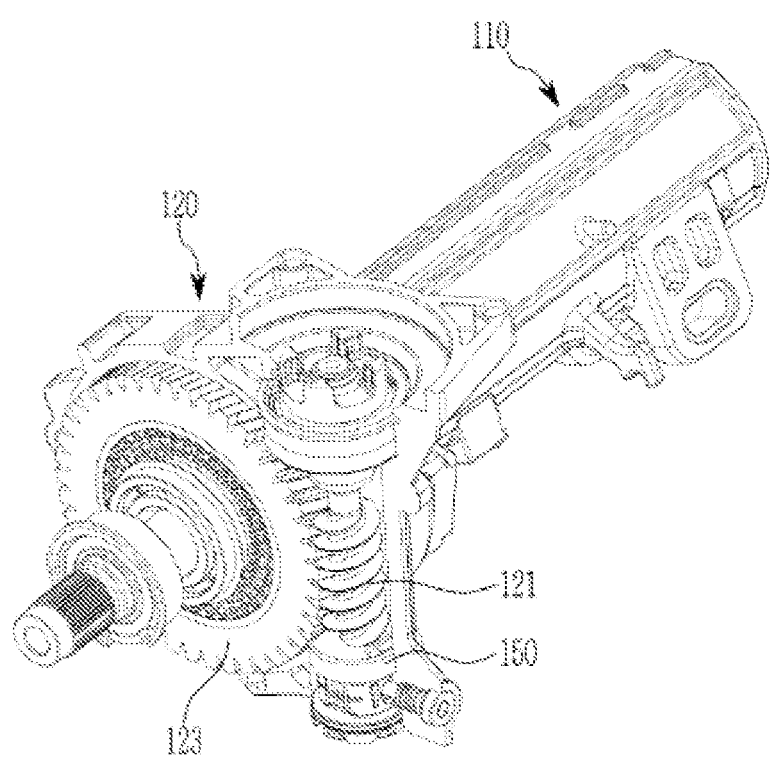
FIG. 2 is a view showing a configuration of a motor driving unit according to an embodiment of the present invention.
Figure 3:
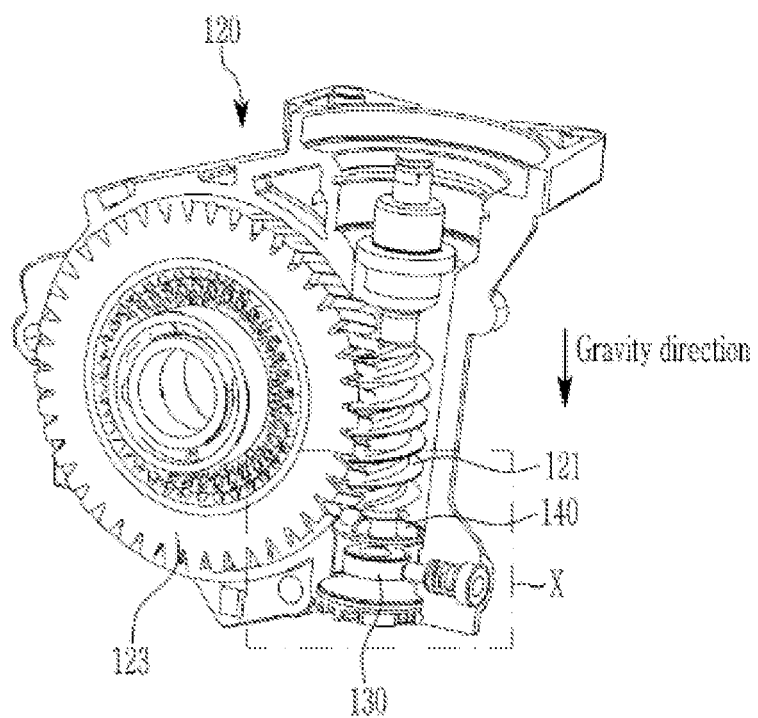
FIG. 3 is a perspective view showing some configurations of FIG. 2.
Figure 4:
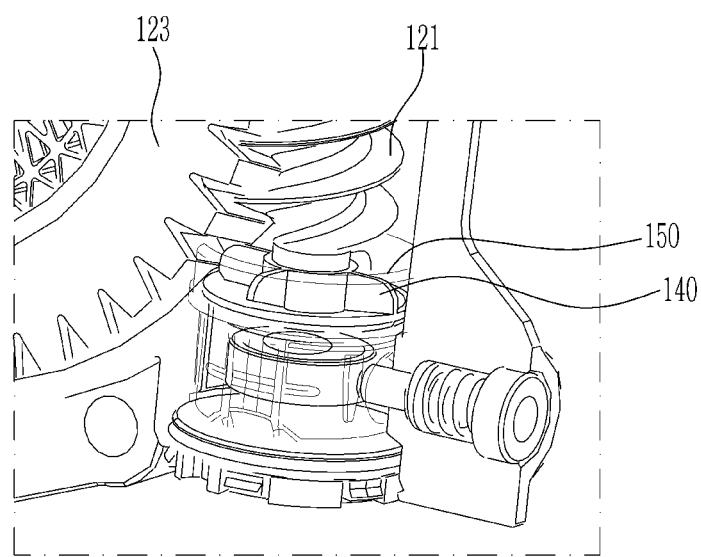
FIG. 4 is a partial perspective view enlarging a display part 'X' of FIG. 3.

FIG. 2 is a view showing a configuration of a motor driving unit according to an embodiment of the present invention. FIG. 3 is a perspective view showing some configurations of FIG. 2. FIG. 4 is a partial perspective view enlarging a display part 'X' of FIG. 3.

Referring to FIG. 2 to FIG. 4, the motor driving unit 100 may include a motor 110 that generates power and a reducer 120 (speed reducer) that is connected to the motor 110 to decelerate the speed of the motor 110 and increase the torque of the motor 110.

The reducer 120 may include a worm gear 121 that is installed inside the housing of the reducer 120, and a worm wheel 123 that is geared with the worm gear 121.

The worm gear 121 is coupled to the drive shaft of the motor 110 and may be rotatably mounted to the reducer 120 housing via a bearing 130. The end of the worm gear 121 (the opposite side end of the motor 110) may be mounted to face the downward direction (or a gravity direction) of the vehicle.

The worm wheel 123 is gear-engaged with the worm gear 121, and a lubrication agent such as grease may be applied to the worm wheel 123 and the worm gear 121. The reduction ratio of the motor 110 is determined by the gear ratio between the worm gear 121 and the worm wheel 123.

A rotation member 140 is installed between the end of the worm gear 121 and the bearing 130. The rotation member 140 may be installed by being press-fitted onto the shaft of the worm gear 121.

Figure 5:
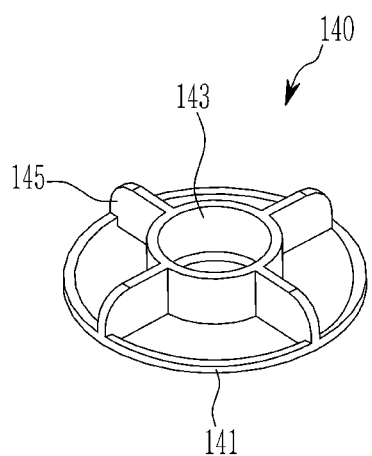
FIG. 5 is a perspective view showing a configuration of a rotation member according to an embodiment of the present invention.

FIG. 5 is a perspective view showing a configuration of a rotation member according to an embodiment of the present invention.

Referring to FIG. 5, the rotation member 140 is press-fitted to the shaft of the worm gear 121 to be installed and rotates integrally with the worm gear 121.

The rotation member 140 includes a rotation body 141 and at least one blade 145 formed on the rotation body 141.

A fixing hole 143 is formed in the center of the rotation member 140, and the fixing hole 143 is press-fitted to the shaft of the worm gear 121 so that the rotation member 140 may be fixedly installed on the worm gear 121.

The rotation body 141 is press-fitted to the shaft of the worm gear 121 through the fixing hole 143 and is approximately formed in a disk shape.

A blade 145 is formed to be protruded from the rotation body 141 in the direction toward the motor 110, and a plurality of blades may be formed as needed. The blade 145 may be formed on the upper surface of the rotation body 141 (or the opposite side of the bearing 130). A plurality of blades 145 may be formed on the rotation body 141 at equal intervals in the circumferential direction.

Figure 6:
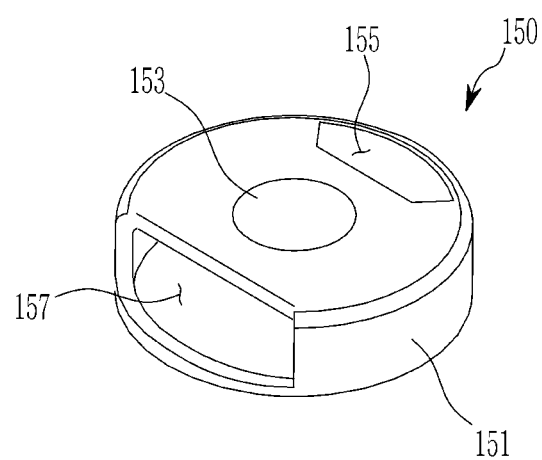
FIG. 6 is a perspective view showing a configuration of a lubrication agent pocket according to an embodiment of the present invention.

FIG. 6 is a perspective view showing a configuration of a lubrication agent pocket according to an embodiment of the present invention.

Referring to FIG. 6, the lubrication agent pocket 150 may include a pocket housing 151, and an inlet 155 and an outlet 157 formed in the pocket housing 151.

The pocket housing 151 is fixedly installed inside the reducer 120 housing. The pocket housing is formed in the shape of an empty cylinder with the inside, and a rotation member is rotatably disposed inside the pocket housing.

In the center of the pocket housing, a central hole 153 into which the shaft of the worm gear is inserted is formed.

The inlet 155 is formed on the upper part of the pocket housing 151 and is opened toward the axial direction of the worm gear 121 (or the direction toward the motor 110). The lubrication agent (e.g., the grease) applied to the worm gear 121 and the worm wheel 123 may be inflowed into the pocket housing 151 through the inlet 155.

The outlet 157 is formed on the side of the pocket housing 151 and is opened toward the worm wheel 123. The lubrication agent (e.g., the grease) inflowed into the pocket housing 151 may be discharged toward the worm wheel 123 through the outlet 157.

Hereinafter, the operation of the motor driven power steering device 1 according to an embodiment of the present invention as described above is described in detail with reference to the attached drawings.

Figure 7:
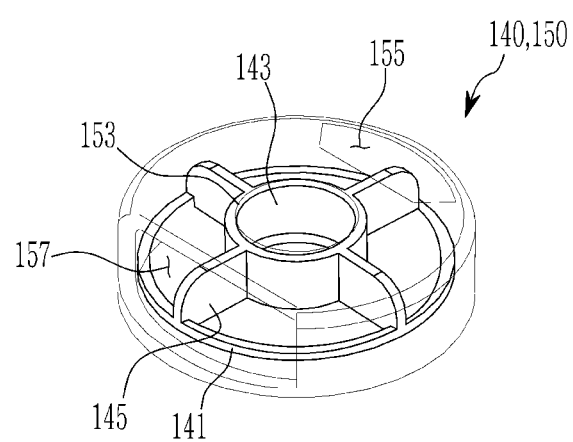
FIG. 7 is a perspective view showing a configuration of a rotation member and a lubrication agent pocket according to an embodiment of the present invention.

FIG. 7 is a perspective view showing a configuration of a rotation member and a lubrication agent pocket according to an embodiment of the present invention.

Referring to FIG. 7, first, when the motor driving unit 100 is assembled, after the lubrication agent is applied between the worm gear 121 and the worm wheel 123, in the reducer 120 housing, the motor 110, the worm gear 121, the worm wheel 123, the rotation member 140, the lubrication agent pocket 150, and the bearing 130 are assembled inside the reducer 120 housing.

Specifically, the worm wheel 123 is rotatably assembled on the reducer 120 housing, and the lubrication agent pocket 150 is fixedly installed on the reducer 120 housing. In a state that the worm gear 121 is press-fitted and coupled to the drive shaft of the motor 110, the end of the worm gear 121 is inserted into the central hole 153 of the lubrication agent pocket 150. The rotation member 140 is press-fitted to the shaft of the worm gear 121 to be fixedly installed, and the shaft of the worm gear 121 is assembled to the reducer 120 housing through the bearing 130. If the worm gear 121 and worm wheel 123 are gear assembled, a lubrication agent (e.g., grease) is applied to the worm gear 121 and the worm wheel 123.

When the motor 110 operates, the worm gear 121 and the worm wheel 123 are engaged and rotated, and the worm gear 121 and the worm wheel 123 are rotated smoothly by the applied lubrication agent.

Since the worm gear 121 is disposed toward the downward direction (or the direction of gravity), the lubrication agent applied to the worm gear 121 and the worm wheel 123 flows downward by gravity. The downwardly flowing lubrication agent inflows through the inlet 155 of the lubrication agent pocket 150 into the interior of the pocket housing 151 (referring to step (a) of FIG. 8).

Figure 8:
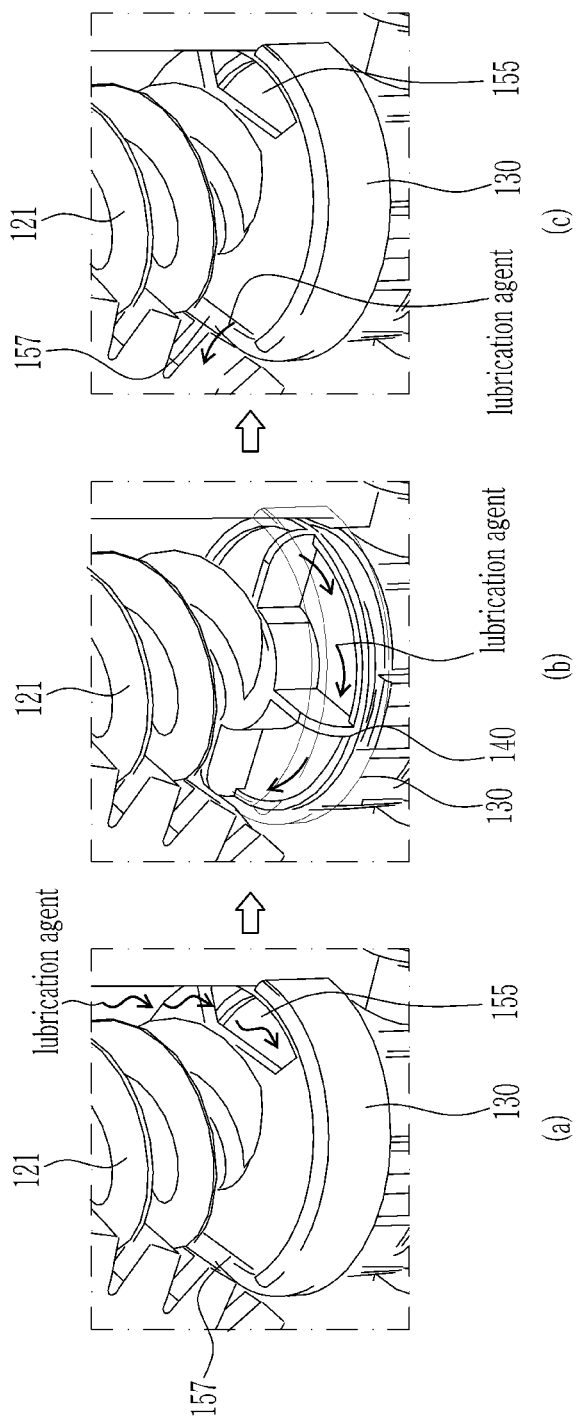
FIG. 8 is a view for explaining an operation of a reducer of a motor driven power steering device according to an embodiment of the present invention.

The lubrication agent inflowed into the pocket housing 151 of the lubrication agent pocket 150 is disposed inside the pocket housing 151 and no longer flows downward by the rotation body 141 of the rotation member 140 that rotates integrally with the worm gear 121 (referring to step (b) of FIG. 8).

The blade 145 of the rotation member 140 circulates the lubrication agent inflowed into the inside of the pocket housing 151 and exhausts it to the outlet 157 of the pocket housing 151. Accordingly, the lubrication agent inflowed into the pocket housing 151 is discharged toward the worm wheel 123 through the outlet 157 of the pocket housing 151 (referring to FIG. step (c) of FIG. 8).

According to the motor driven power steering device 1 according to an embodiment of the present invention as described above, the lubrication agent applied between the worm gear 121 and the worm wheel 123 does not flow into the bearing 130 by the rotation member 140 that is press-fitted to the shaft of the worm gear 121 and rotates integrally.

And the lubrication agent applied between the worm gear 121 and the worm wheel 123 is temporarily inflowed into the pocket housing 151 of the lubrication agent pocket 150, and then is discharged in the direction of the worm wheel 123 by the blade 145 of the rotation member 140. As such, by recirculating the lubrication agent applied to the worm gear 121 and the worm wheel 123, noise and vibration generated between the worm gear 121 and the worm wheel 123 may be reduced.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A motor driven power steering device comprising:
   a motor; and
   a speed reducer coupled to the motor, wherein the speed reducer comprises:
      a worm gear coupled to a drive shaft of the motor and rotatably installed to a reducer housing through a bearing;
      a worm wheel gear-coupled with the worm gear; and
      a rotation member mounted between the worm gear and the bearing and configured to circulate a lubrication agent applied between the worm gear and the worm wheel, wherein the worm gear and the worm wheel are oriented so that the lubrication agent applied to the worm gear and the worm wheel flows downward by gravity so that the lubrication agent is discharged toward the worm wheel by rotation of the rotation member.

2. The motor driven power steering device of claim 1, wherein the rotation member comprises:
   a rotation body mounted on a shaft of the worm gear; and
   at least one blade formed on the rotation body.

3. The motor driven power steering device of claim 2, wherein a first side of the bearing faces the rotation member and wherein the blade is formed on a second side of the bearing, the second side opposite the first side.

4. The motor driven power steering device of claim 2, wherein a plurality of blades are formed at equal intervals on the rotation body.

5. The motor driven power steering device of claim 2, wherein the rotation member is press-fitted onto the shaft of the worm gear.

6. The motor driven power steering device of claim 2, further comprising a lubrication agent pocket installed in the speed reducer housing and configured to discharge the lubrication agent flowing along the worm gear in a direction of the worm wheel.

7. The motor driven power steering device of claim 6, wherein the lubrication agent pocket comprises:
   a pocket housing provided to surround the rotation member;
   an inlet formed in the pocket housing and opened in a shaft direction of the worm gear; and
   an outlet formed in the pocket housing and opened in the direction of the worm wheel.

8. The motor driven power steering device of claim 6, wherein the lubrication agent pocket is fixedly installed on the speed reducer housing.

9. A vehicle comprising:
a vehicle body having a lower portion and an upper portion, the lower portion beneath the upper portion in a direction of gravity; and
a motor driven power steering device coupled to the vehicle body, the motor driven power steering device comprising:
  a motor; and
  a speed reducer configured to decelerate a rotation speed of the motor, wherein the speed reducer comprises:
    a worm gear coupled to a drive shaft of the motor and rotatably installed to a speed reducer housing through a bearing, wherein the worm gear is oriented in the direction of gravity;
    a worm wheel gear-coupled with the worm gear, the worm wheel being oriented in the direction of gravity; and
    a rotation member mounted between the worm gear and the bearing and configured to circulate a lubrication agent applied between the worm gear and the worm wheel, the rotation member comprising a rotation body mounted on a shaft of the worm gear and at least one blade formed on the rotation body.

10. The vehicle of claim 9, wherein the rotation member is press-fitted onto the shaft of the worm gear.

11. The vehicle of claim 9, further comprising a lubrication agent pocket installed in the speed reducer housing and configured to discharge the lubrication agent flowing along the worm gear in a direction of the worm wheel.

12. The vehicle of claim 11, wherein the lubrication agent pocket comprises:
a pocket housing provided to surround the rotation member;
an inlet formed in the pocket housing and opened in a shaft direction of the worm gear; and
an outlet formed in the pocket housing and opened in the direction of the worm wheel.

13. The vehicle of claim 11, wherein the lubrication agent pocket is fixedly installed on the speed reducer housing.

14. A motor driven power steering device comprising:
a motor; and
a speed reducer configured to decelerate a rotation speed of the motor, wherein the speed reducer comprises:
  a worm gear coupled to a drive shaft of the motor and rotatably installed to a speed reducer housing through a bearing;
  a worm wheel gear-coupled with the worm gear; and
  a rotation member mounted between the worm gear and the bearing and configured to circulate a lubrication agent applied between the worm gear and the worm wheel, wherein the rotation member comprises a rotation body mounted on a shaft of the worm gear and a plurality of blades formed on the rotation body and wherein the worm gear and the worm wheel are oriented so that the lubrication agent applied to the worm gear and the worm wheel flows downward by gravity so that the lubrication agent is discharged toward the worm wheel by rotation of the rotation member.

15. The motor driven power steering device of claim 14, wherein a first side of the bearing faces the rotation member and wherein the blades are formed on a second side of the bearing, the second side opposite the first side.

16. The motor driven power steering device of claim 14, wherein the plurality of blades are formed at equal intervals on the rotation body.

17. The motor driven power steering device of claim 14, wherein the rotation member is press-fitted onto the shaft of the worm gear.

18. The motor driven power steering device of claim 14, further comprising a lubrication agent pocket installed in the speed reducer housing.

19. The motor driven power steering device of claim 18, wherein the lubrication agent pocket comprises:
a pocket housing provided to surround the rotation member;
an inlet formed in the pocket housing and opened in a shaft direction of the worm gear; and
an outlet formed in the pocket housing and opened in the direction of the worm wheel.

20. The vehicle of claim 9, wherein the worm gear and the worm wheel are oriented so that the lubrication agent applied to the worm gear and the worm wheel flows downward by gravity so that the lubrication agent is discharged toward the worm wheel by rotation of the rotation member.

* * * * *